(12) United States Patent
Jaspers

(10) Patent No.: US 7,123,297 B2
(45) Date of Patent: Oct. 17, 2006

(54) PROCESSING A SENSOR OUTPUT SIGNAL INCLUDING A CLIP

(75) Inventor: Cornelis Antonie Maria Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1048 days.

(21) Appl. No.: 09/894,085

(22) Filed: Jun. 28, 2001

(65) Prior Publication Data

US 2002/0054219 A1    May 9, 2002

(30) Foreign Application Priority Data

Jun. 29, 2000  (EP) .................................. 00202262

(51) Int. Cl.
*H04N 5/217* (2006.01)

(52) U.S. Cl. ................... 348/241; 348/222.1; 348/280; 348/364

(58) Field of Classification Search ................ 348/222, 348/241, 242, 273, 255, 259, 223.1, 222.1, 348/364, 280

See application file for complete search history.

(56) References Cited

U.S. PATENT DOCUMENTS

| | | | | |
|---|---|---|---|---|
| 4,697,208 A |   | 9/1987 | Eino ............................. | 358/44 |
| 5,552,827 A |   | 9/1996 | Maenaka et al. ............ | 348/266 |
| 5,659,358 A | * | 8/1997 | Hieda .......................... | 348/255 |
| 5,712,680 A |   | 1/1998 | Hieda .......................... | 348/220 |
| 6,650,363 B1 | * | 11/2003 | Ukita ....................... | 348/223.1 |
| 6,697,110 B1 | * | 2/2004 | Jaspers et al. .............. | 348/272 |

FOREIGN PATENT DOCUMENTS

| | | |
|---|---|---|
| JP | 08256344 A | 10/1996 |
| WO | 9904555 A2 | 1/1999 |
| WO | WO9904555 | 1/1999 |
| WO | WO 9904555 A2 * | 1/1999 |

* cited by examiner

*Primary Examiner*—Tuan Ho
*Assistant Examiner*—Gary C. Vieaux
(74) *Attorney, Agent, or Firm*—Aaron Waxler; Paul Im

(57) ABSTRACT

A signal processing device for a sensor output signal from a sensor covered by a color mask pattern having a plurality of colors, the signal processing device comprising a reconstruction unit (5) for generating a plurality of color signal values (R, G, B) for each pixel from the sensor output signal; and a clipping device (8) for clipping the sensor output signal or the plurality of color signal values (R, G, B). Preferably, the signal processing device further comprises: a conversion unit (6) for generating luminance signals (Y) and chrominance signals (U, V) from the plurality of color signal values (R, G, B), and an adjustment unit (10) for selectively setting the chrominance signals (U, V) to a zero color difference when clipping is performed (8). Advantageously, the clipping device (8) is arranged between the sensor (3) and the reconstruction unit (5), and the signal processing device further comprises a single bit white clip delay unit (11) for generating a switch signal for the adjustment unit (10), the switch signal comprising an at least 2×2 bit array from, or at least in response to, a signal (SS) from the clipping device (8) indicating that clipping has occurred.

10 Claims, 4 Drawing Sheets

PROCESSING A SENSOR OUTPUT SIGNAL INCLUDING A CLIP

The invention relates to a method and device for processing a sensor output signal, and to a camera comprising such a device.

In known signal processing devices and methods for processing sensor output signals undesirable artifacts can occur, which result from the loss of color information, when the sensor used, for instance a RGB Bayer sensor, is overexposed in such a way that the maximum sensitivity of the sensor, for instance the maximum electron charge capacity of the sensor, is exceeded. It will then be impossible to reconstruct the original colors, especially white, resulting in undesirable artifacts. This is even more a problem, when in reconstructing color signal values for any pixel information is used which information relates to surrounding or adjacent pixels. The reconstructed color signal values can then result in discontinuities, where the sensor sensitivity is exceeded and artifacts are generated in an image constructed from luminance and chrominance signals converted from the reconstructed color signal values.

It is, inter alia, an object of the invention to provide an improved sensor output signal processing. To this end, the invention provides a sensor output signal processing as defined in the independent claims. Advantageous embodiments are defined in the dependent claims.

With the present invention, undesirable artifacts are effectively prevented. No color information on a specific color is lost, and discontinuities can be effectively prevented, as well as therewith artifacts in a resulting image.

In a preferred embodiment a pre-processor is arranged between the sensor and the reconstruction unit and the pre-processing unit comprises an additional clipping device to limit the dynamic range of the amplitude of the sensor output signal, where the clipping level of the clipping device is lower than the clipping level of the additional clipping device in the pre-processor. In a device according to this preferred embodiment, subsequent digitization of the signals is simplified, without loss of any information or quality of the resulting image.

In another preferred embodiment the clipping device is connected to a single bit white clip delay unit, which generates a switch signal comprising an at least 2×2 bit pixel array from, or at least in response to, a signal from the clipping device indicating that clipping has occurred. In such an embodiment of the invention the switch signal not only indicates that the chrominance signals are to be set to zero color difference, when clipping has occurred, but also can take the place of such color difference signals as a full white pixel signal. Thereby white clipping is guaranteed over the range of the array, if one of the color signal values exceeds the clipping level. Such a single bit white clip delay unit can comprise at least one bit delay unit and one bit row delay unit, in order to obtain the desired range of the array, corresponding with the pixels in the color mask pattern.

Further a delay adaptation circuit can be connected to the single bit white clip delay unit to synchronize the switch signal from the single bit white clip delay unit with the luminance and chrominance signals. As the luminance and chrominance signals are often derived in subsequent processing, after clipping has been effected, the delay adaptation circuit insures insertion of the signals generated by the single bit white clip delay unit and the chrominance signals.

Further the reconstruction unit can comprise a contour processor, which, in the reconstruction of a specific pixel, includes surrounding pixels and wherein the single bit white clip delay unit comprises an N×M single bit contour off generator. In this way reconstruction of the signals for a specific pixel can not result in higher values for a specific color signal than the clipping level, which could again result in undesirable artifacts, which is therefore effectively prevented. Another advantage is, that by extending the single bit white clip delay unit to provide the contour processor off signal undesired sharpening at the white clipped edges can be prevented, whereby the picture quality will be improved.

In another preferred embodiment the clipping device is arranged in the analog path from the sensor to a subsequent analog-to-digital converter (ADC), prior to subsequent processing or pre-processing. Such a configuration has considerable advantages. In this way an analog white balance control can be achieved, enabling a non-linear processing method, like gamma or knee prior to the analog-to-digital conversion, resulting in considerably lower quantities of bits for the analog-to-digital converter to convert. Further a luminance based reconstruction method can be provided, where the green signal and white corrected red and blue signals can be used.

These and other aspects of the invention will be apparent from and elucidated with reference to the embodiments described hereinafter.

In the drawings.

In the different figures, the same or similar components are identified with the same reference numbers.

Before proceeding with the description of the figures, it is noted here, that in all shown and described embodiment an RGB Bayer sensor is used, although the present invention is not limited thereto. An RGB Bayer sensor comprises the following RGB color mask pattern:

RGRGRGRGRGRGRGRG
GBGBGBGBGBGBGBGB
RGRGRGRGRGRGRGRG
GBGBGBGBGBGBGBGB

Therefore in this color mask pattern the following elementary pattern is repeated for each pixel:

RG
GB

Such a unit is the smallest luminance pixel of a RGB Bayer sensor. According to the present invention the sensor output signal or a reconstructed plurality of color signal values are clipped with the clipping device in order to prevent signals with a higher level than the maximum sensitivity of the Bayer sensor from creating artifacts in the resulting image.

If for instance the G signal, which is representative for the color green, exceeds the maximum sensitivity of the sensor, not only a color balance is lost, but also much of the luminance information, to which the G signal is most closely correlated, is effected. The present invention is directed at preventing that undesirable artifacts resulting therefrom are generated.

Figure 1:
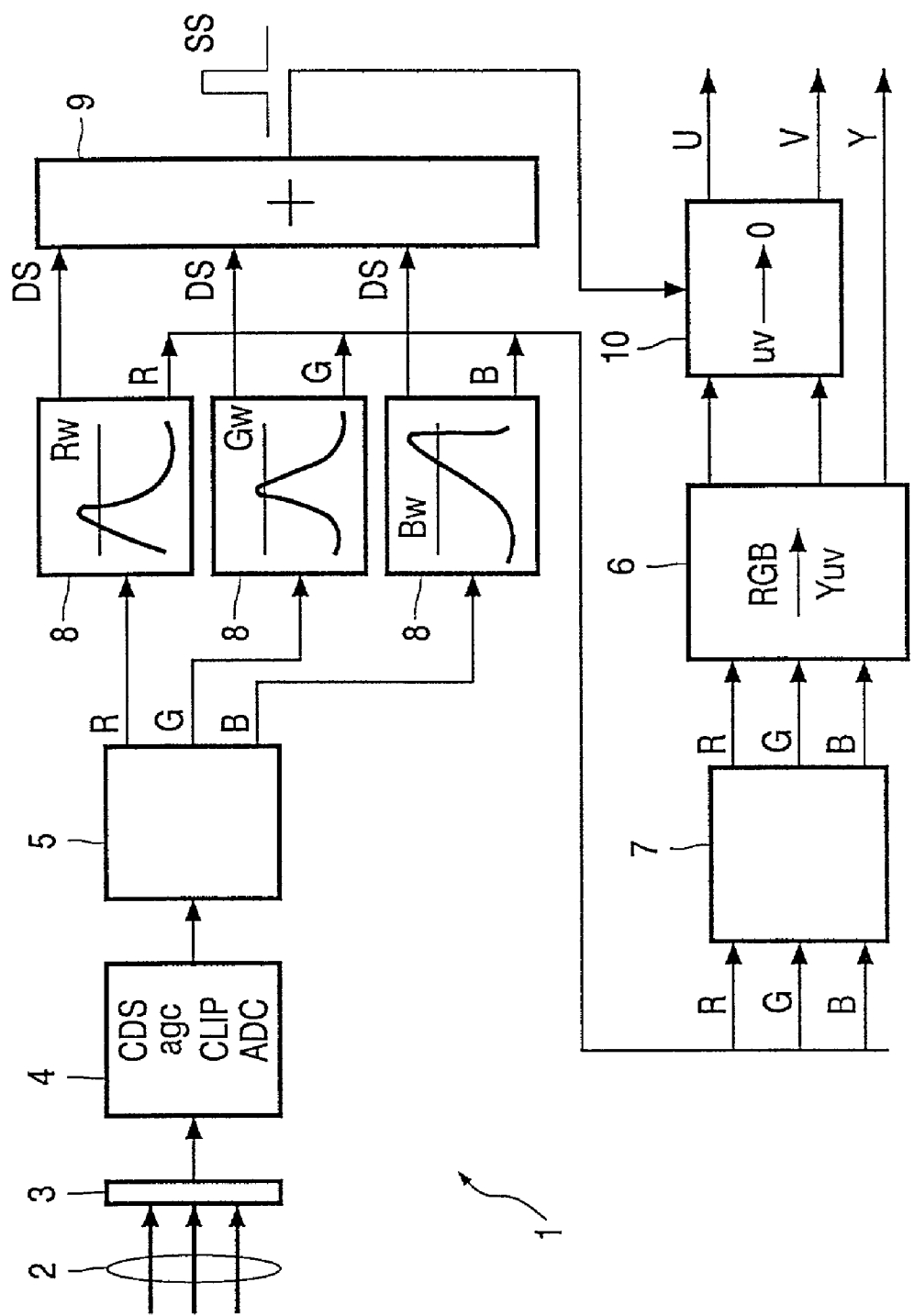
FIG. 1 shows a schematic representation of a device according to the present invention.

The device 1 shown in FIG. 1 is a signal processing device, where an image is captures with a lens 2 and a sensor 3, which sensor 3 generates a sensor output signal. The sensor 3 is covered by a color mask pattern having a plurality of colors. The sensor output signal from the sensor 3 is sent to the pre-processor 4, which by way of example only, comprises a correlated double sampling (CDS) circuit for noise reduction, an automatic gain circuit (agc) for low light conditions and an analog-to-digital converter (ADC).

After having been subjected to pre-processing in the pre-processor 4, the sensor output signal is sent to reconstruction unit 5 for RGB reconstruction to obtain color signal values for each pixel from the pre-processed sensor output signal. The color signal values for each pixel are output to a conversion unit 6 for generating luminance and chrominance signals (Y; U, V) from the color signal values for each pixel via circuit 7, in which the color signal values (R, G, B) are optionally subjected to matrix white balance processing and/or non-linear processing, such as gamma-processing.

Three clipping devices 8 are arranged between the reconstruction unit 5 and the circuit 7 for each of the color signal values (R, G, B). The clipping devices detect whether or not each of the reconstructed color signal values exceeds a predetermined threshold or clip level, designated Rw, Gw, Bw in FIG. 1. If an arbitrary one of the color signal values R, G, B exceeds the corresponding clip level Rw, Gw, Bw, then the clipping device is activated to limit the output signal thereof to the clip level. The clip levels are predetermined to a level below, preferably slightly below, the maximum sensitivity of the sensor, which, in the case of a RGB Bayer sensor, is the maximum charge capacity thereof. Therefore, in the signal processing device 1 the clipping devices 8 can determine whether or not the maximum sensitivity of the sensor 3 has been exceeded for any one of the color signal values and that therefore information in any one of these color signal values has been lost. This phenomenon would result in artifacts in an image reconstructed with the chrominance and luminance signals (U, V; Y). In order to prevent such artifacts the clipping devices output a detection signal DS to a OR circuit 9, which generates a switch signal SS from the detection signals DS if at least one of the detection signals from the clipping devices 8 indicates, that at least one of the clipping devices 8 concerned has been activated as a result of the color signal value input thereto has exceeded the predetermined clip level Rw, Gw, Bw thereof.

The OR circuit 9 outputs this switch signal to an adjustment unit 10, in which the chrominance signals (U, V) are switched to zero if and when any one of the color signal values is clipped, i.e. when one of the clipping devices 8 has been activated, which is indicated by the switch signal SS.

The clipping devices 8 have been placed in the signal path after RGB reconstruction by the reconstruction unit 5. The reconstruction unit 5 can be embodied such, that when reconstructing the color signal values for a specific pixel, the signals from surrounding pixels are taken into account. Thus reconstruction with the surrounding pixels can result in discontinuities in the color signal values. These discontinuities can result in higher color signal values than the clip level of a clipping device, if that clipping device were placed before the reconstruction unit 5 in the signal path. By placing clipping devices after the RGB reconstruction by the reconstruction unit 5 for each of the color signal values R, G, B, such discontinuities are effectively detected and are thus prevented from causing artifacts in an image generated from the chrominance signals and luminance signal (U, V; Y).

It is noted here, that the pre-processor 4 further includes, as an option in the embodiment of FIG. 1, an additional clipping device. In such an embodiment of the invention the dynamic range of the amplitude of the sensor output signal can be limited with advantages, which will be immediately clear to a person skilled in the art, in relation to the further processing of the sensor output signal, especially in relation to coding processes, analog to digital conversion, RGB reconstruction, et cetera. In such an embodiment with an additional clipping device in the pre-processor 4 the clip level of the clipping devices 8 in the signal path after the RGB reconstruction by the reconstruction unit 5 will have to be lower than the clip level of the additional clipping device in the pre-processor 4 in order to prevent artifacts from being generated by the RGB reconstruction from surrounding pixels.

Figure 2:
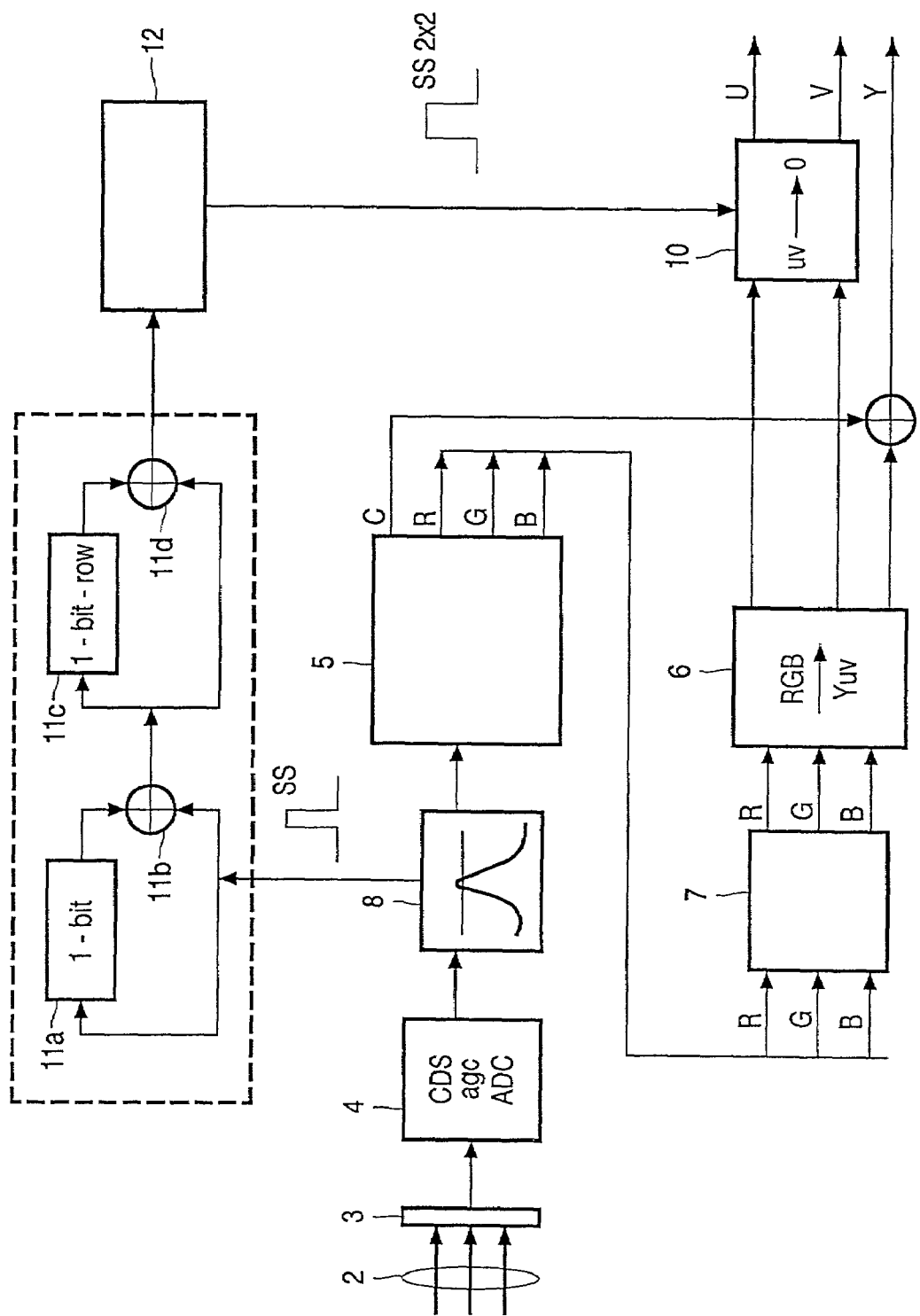
FIG. 2 shows a schematic representation of an alternative device according to the present invention.

In the embodiment of FIG. 2 a single clipping device 8 is arranged between the pre-processor 4 and the reconstruction unit 5. The reconstruction unit 5 takes an N×M area of pixels into consideration, when reconstructing the color signal values R, G, B. In order to prevent artifacts from occurring in an image generated from the chrominance and luminance signals (U, V; Y), resulting from discontinuities in the color signal values R, G, B as a result of involving surrounding pixel signals in reconstructing the color signal values, the following measures are taken.

When the clipping device 8 generates a switch signal SS to indicate, that it has been activate to clip the sensor output signal from the sensor 3 and pre-processed by the preprocessor 4, this switch signal SS is used in single bit white clip delay unit 11 to generate a 2×2 switch signal, which is sent to a delay adaptation circuit 12 to obtain a 2×2 switch signal SS2×2 to control the adjustment unit 10. The single bit white clip delay unit 11 comprises a 1 bit delay 11a, an adder 11b that sums the input and the output of the 1 bit delay 11a for achieving a two pixel wide switch signal, a 1 bit row delay 11c, and an adder 11d that sums the input and the output of the 1 bit row delay 11c. Thereby a single pulse SS is transformed into a 2×2 square of pulses that forms a two pixel wide, two row high white clip switch signal. A two by two array is sufficient to prevent white clip artifacts, because the smallest luminance signal of a sensor, such as a RGB Bayer sensor, is a two by two RG/GB array. Thus the single bit white clip delay unit 11 ensures white clip over a 2×2 pixel array if at least one of the R, G or B pixel exceeds the white clip level. The delay in the delay adaptation circuit 12 corresponds with processing by the various components subsequent to the clipping device 8.

The reconstruction unit 5 further realizes contour processing, as a result of which a contour signal C is incorporated into the luminance signal Y. As a result of the configuration described above, it has become possible to avoid undesired sharpening at edges of an area, which has been subjected to the effect of the clipping device 8. Thereby the picture quality is improved.

Further it is noted that it is even possible to arrange the clipping device 8 in front of the analog to digital converter in the pre-processor 4, whereby the clipping device is arranged in the analog domain. In this manner it is possible to realize for example an analog white balance control and possibly even a none-linear processing method, like 'gamma' or 'knee', being executed prior to analog to digital conversion, which will result in a lower quantity of bits for the analog to digital converter to convert. Also a luminance based reconstruction method can be devised, where G and in white levels corrected R and B signals can be used.

Figure 3:
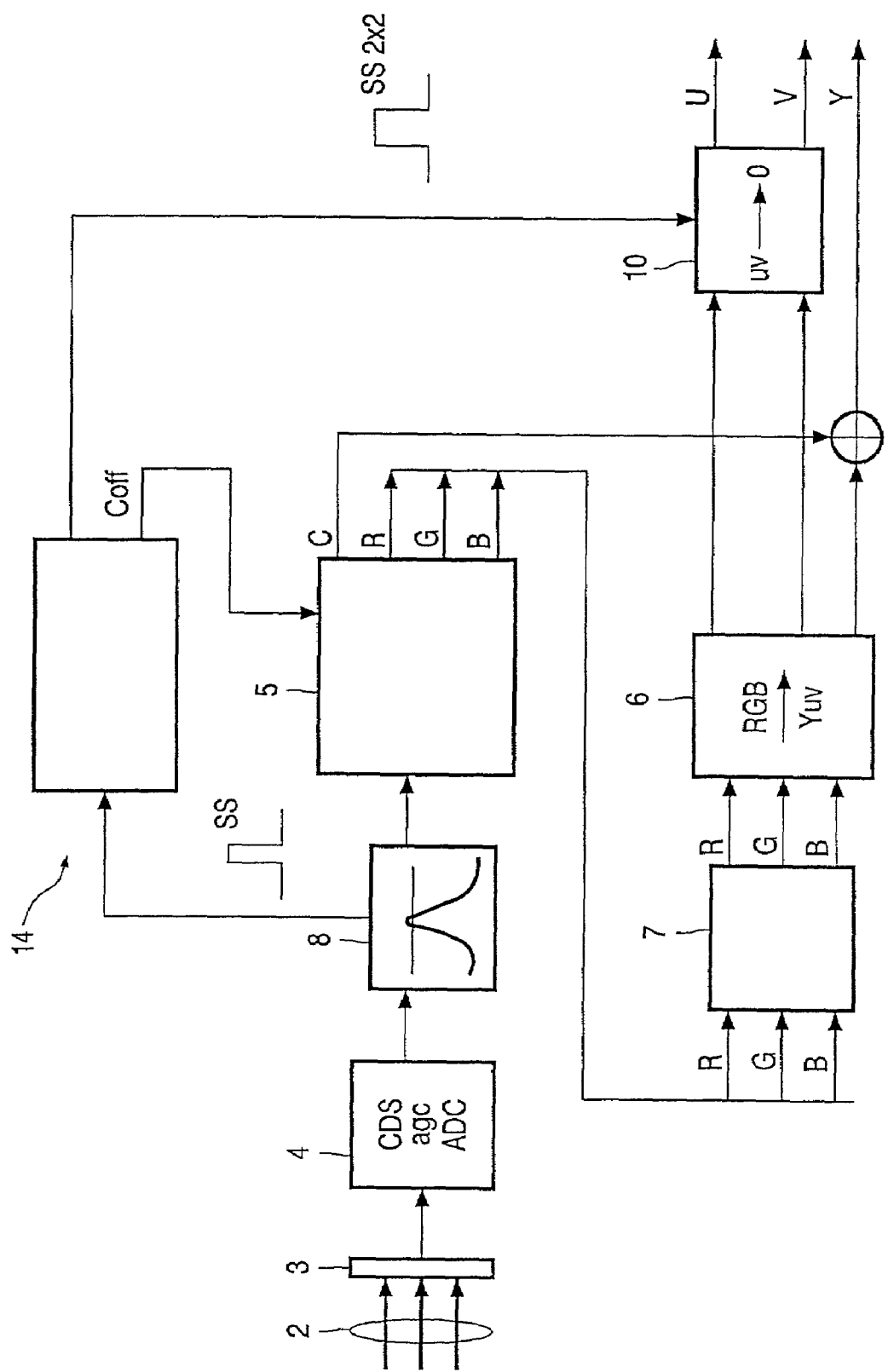
FIG. 3 shows a schematic representation of a further alternative embodiment of a device according to the present invention.
Figure 4:
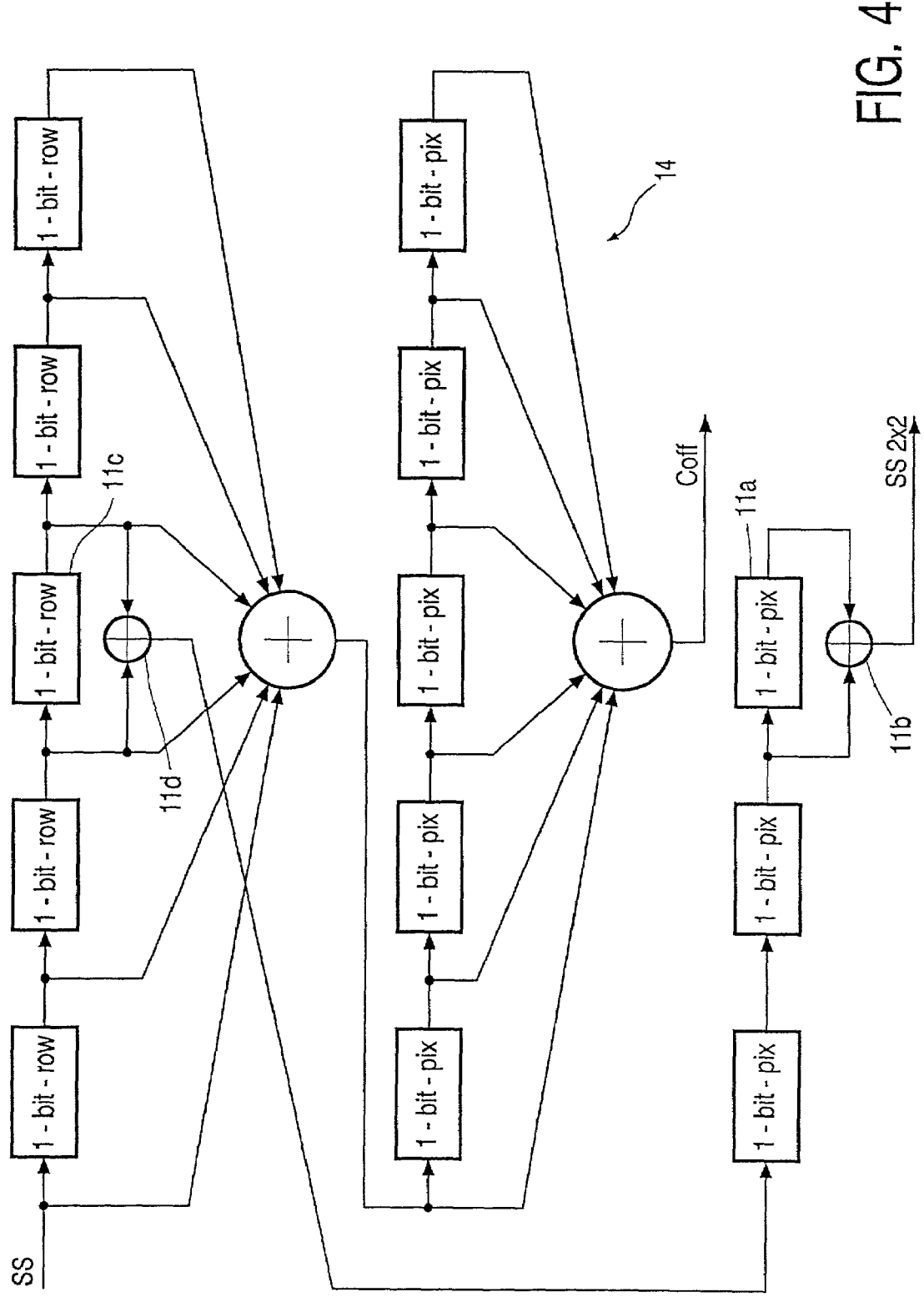
FIG. 4 shows a schematic representation of a single bit white clip delay unit of FIG. 3.

FIGS. 3 and 4 show an embodiment of a signal processing device, in which the above described option to limit the effect of contour processing is further elucidated. Herein the reconstruction unit 5 comprises a contour processor, as is described above, which in reconstructing a specific pixel, includes surrounding pixels. In order to disable this contour processor the single bit white clip delay unit 11 of FIG. 2 is replaced by a single bit white clip delay unit 14 that further comprises an N×M single bit contour processor off signal generator, as is explicitly shown in Fig. 4. The N×M single bit contour processor off signal generator generates a contour processor off signal Coff, which inhibits contour processor for a 6 by 6 array of pixels, surrounding the pixel, for which the clipping device 8 has been activated. It is noted here, that other arrays, such as a 5 by 5 or 5 by 3 (horizontal x vertical) array, or any other arbitrary array can be used. This would require a corresponding adjustment in the configuration, shown in FIG. 4. For instance, for a 5×5 array the last 'one bit row' to the right can be deleted, while the contour processor off signal can be obtained without the last 'one bit pix' delay, while the rest of the configuration can be maintained. Other arbitrary arrays, with which the contour processor off signal van correspond, will require similar adaptation relative to the configuration of FIG. 4.

In FIG. 3 the reconstruction unit 5 outputs a contour signal, besides the RGB color signal values, where the contour signal is to be incorporated into the luminance signal Y in the same way, as is described in relation to FIG. 2. By preventing the contour from being taken into account in the reconstruction unit 5, the undesired sharpening at edges of areas, which have been subjected to clipping by the clipping device 8, is effectively avoided, whereby the picture quality is improved.

It is noted here, that several alternative embodiments of the present invention, other than those that have been explicitly described above, will be immediately apparent to a person skilled in the art. For instance, the array, for which the contour processor off signal is generated by generator 14, can be varied, dependent upon the required sharpness of an image to be obtained. Further the RGB Bayer sensor 3 shown in the figures and described above, can be replaced by any other sensor, which has a color mask pattern for a plurality of colors, where the sensitivity of the sensor in specific parts of the pattern and for specific colors, has a maximum and can be exceeded. Also most, if not all of the components, which have been described as hardware components above, can be implemented in software as an alternative or additionally, without departing from the scope of the invention. Therefore the scope of protection for the present invention should not be restricted to any one specific embodiment, but is only limited by the definition of the invention according to the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A signal processing device for a sensor output signal from a sensor covered by a color mask pattern having a plurality of colors, the signal processing device comprising:
    a reconstruction unit (5) for generating a plurality of color signal values (R, G, B) for each pixel from the sensor output signal; and
    a clipping device (8) for clipping the sensor output signal or the plurality of color signal values (R, G, B), wherein the clipping device detects whether or not each of the reconstructed color signal values exceeds a predetermined threshold clip level below the maximum sensitivity of the sensor.

2. The signal processing device according to claim 1, further comprising:
    a conversion unit (6) for generating luminance signals (Y) and chrominance signals (U, V) from the plurality of color signal values (R, G, B); and
    an adjustment unit (10) for selectively setting the chrominance signals (U, V) to a zero color difference when clipping is performed (8).

3. The signal processing device according to claim 2, wherein the clipping device (8) is arranged between the sensor (3) and the reconstruction unit (5), and wherein the signal processing device further comprises a single bit white clip delay unit (11) for generating a switch signal for the adjustment unit (10), the switch signal comprising an at least 2×2 bit array from, or at least in response to, a signal (SS) from the clipping device (8) indicating that clipping has occurred.

4. The signal processing device according to claim 3, wherein the reconstruction unit (5) comprises a contour processor, which, in the reconstruction of a specific pixel, includes surrounding pixels, and wherein the single bit white clip delay unit (11) comprises an N×M single bit contour processor off signal generator.

5. The signal processing device according to claim 1, wherein a preprocessor (4) is arranged between the sensor (3) and the reconstruction unit (5), said pre-processing unit (4) comprising an additional clipping device to limit the dynamic range of the amplitude of the sensor output signal, where a clipping level of the clipping device (8) is lower than a clipping level of the additional clipping device in the preprocessor (4).

6. The signal processing device according to claim 5, wherein the preprocessor (4) further comprises at least one of the units from the group, which comprises an automatic gain control circuit for low light conditions, an analog-to-digital converter, a sampling circuit, and a correlated double sampling circuit for sensor noise reduction.

7. The signal processing device according to claim 1, wherein the clipping device (8) is arranged in the analog path from the sensor (3) to a subsequent analog-to-digital converter (ADC).

8. The signal processing device according to claim 1, wherein the clipping device (8) is arranged for selective clipping, when the sensor output signal or the plurality of color signal values (R, G, B) exceeds a predetermined clipping level corresponding with a maximum sensitivity of the sensor (3).

9. A method of processing a sensor output signal from a sensor (3) covered by a color mask pattern having a plurality of colors, the signal processing method comprising:
    reconstructing (5) a plurality of color signal values for each pixel from the sensor output signal; and
    clipping (8) the sensor output signal or the plurality of color signal values, wherein the clipping step further comprises detecting whether or not each of the reconstructed color signal values exceeds a predetermined threshold clip level below the maximum sensitivity of the sensor.

10. A camera, comprising:
    a sensor (3); and
    the sensor output signal processing device of claim 1.

* * * * *